(12) United States Patent
Huang et al.

(10) Patent No.: US 11,991,058 B2
(45) Date of Patent: May 21, 2024

(54) CONTAINERIZED SERVICE WITH EMBEDDED SCRIPT TOOL FOR MONITORING HEALTH STATE OF HYPER-CONVERGED INFRASTRUCTURE RESOURCES

(71) Applicant: Dell Products L.P., Round Rock, TX (US)

(72) Inventors: Xiang Huang, Shanghai (CN); Gang Yang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/724,749

(22) Filed: Apr. 20, 2022

(65) Prior Publication Data

US 2023/0269149 A1    Aug. 24, 2023

(30) Foreign Application Priority Data

Feb. 18, 2022  (CN) .......................... 202210154464.2

(51) Int. Cl.
*H04L 43/065* (2022.01)
*H04L 9/40* (2022.01)
*H04L 43/00* (2022.01)
*H04L 43/0817* (2022.01)

(52) U.S. Cl.
CPC ........ *H04L 43/065* (2013.01); *H04L 43/0817* (2013.01); *H04L 43/14* (2013.01); *H04L 63/0442* (2013.01); *H04L 63/062* (2013.01)

(58) Field of Classification Search
CPC ... H04L 43/065; H04L 43/0817; H04L 43/14; H04L 63/0442; H04L 63/062
USPC .......................................................... 709/224
See application file for complete search history.

(56) References Cited

U.S. PATENT DOCUMENTS

| | | | |
|---|---|---|---|
| 10,922,284 B1* | 2/2021 | Venkatasubramanian | H04L 61/4523 |
| 11,456,931 B1* | 9/2022 | May | H04L 41/5025 |
| 2009/0292790 A1* | 11/2009 | Salonikios | G06F 16/10 709/217 |
| 2019/0007382 A1* | 1/2019 | Nirwal | G06F 9/54 |
| 2020/0334371 A1* | 10/2020 | Stoler | G06F 21/31 |
| 2022/0215101 A1* | 7/2022 | Rioux | G06F 21/55 |
| 2022/0311783 A1* | 9/2022 | Meena | H04L 63/1416 |

* cited by examiner

*Primary Examiner* — Meng Vang
(74) *Attorney, Agent, or Firm* — Jackson Walker L.L.P.

(57) ABSTRACT

A disclosed method deploys a containerized health monitoring service that includes an embedded health monitoring service script. The containerized service generates a secure shell (SSH) key pair including an SSH public key and an SSH private key. A management account of the containerized service is registered with a centralized account service. An SSH control module of a hyper-converged infrastructure (HCI) manager retrieves from the account service the management account of the containerized service. The control module visits the containerized service to retrieve the SSH public key and stores the SSH public key to a target resource such as a host or virtual machine to enable any instance of the containerized service to remotely execute the health monitoring service script on the target resource with an SSH command.

12 Claims, 4 Drawing Sheets

CONTAINERIZED SERVICE WITH EMBEDDED SCRIPT TOOL FOR MONITORING HEALTH STATE OF HYPER-CONVERGED INFRASTRUCTURE RESOURCES

TECHNICAL FIELD

The present disclosure relates to information handling systems and, more particularly, hyper-converged information handling systems and health monitoring of same.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyper-converged infrastructure (HCI) employing virtualized compute, storage, and networking resources and a centralized management platform. Increasingly, organizations are evolving their application architectures to highly distributed modern application environments, typically leveraging microservices-based architectures and infrastructure-as-a-service (IaaS) platforms that can be hosted in either or both on-premises data centers or public clouds.

Generally, it is desirable for an HCI management platform to encompass some form of centralized health monitoring service. While there are numerous legacy scripted tools for monitoring host system health, such scripted tools are typically designed to be executed from a command line for monitoring host CPU/memory usage, disk usage, network configuration, and so forth. The command line framework of legacy script tools is not generally suitable for use within a containerized environment. Executing such scripts from a microservice may require infrastructure support, but must also be executed within the host due to permission restrictions.

SUMMARY

In accordance with teachings disclosed herein, common problems associated with leveraging legacy command line health monitoring resources are addressed by methods and systems disclosed herein including a disclosed method in which a container manager deploys a containerized health monitoring service that includes an embedded health monitoring service script. The containerized service generates a secure shell (SSH) key pair including an SSH public key and an SSH private key. An access account of the containerized service is registered with a centralized account service. An SSH control module of a hyper-converged infrastructure (HCI) manager retrieves from the account service access account information for the containerized service and visits the containerized service to retrieve the SSH public key and stores the SSH public key to a target resource such as a host or virtual machine to enable any instance of the containerized service to remotely execute the health monitoring service script on the target resource with an SSH command. In at least one embodiment, the containerized health monitoring service is implemented as a docker image.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
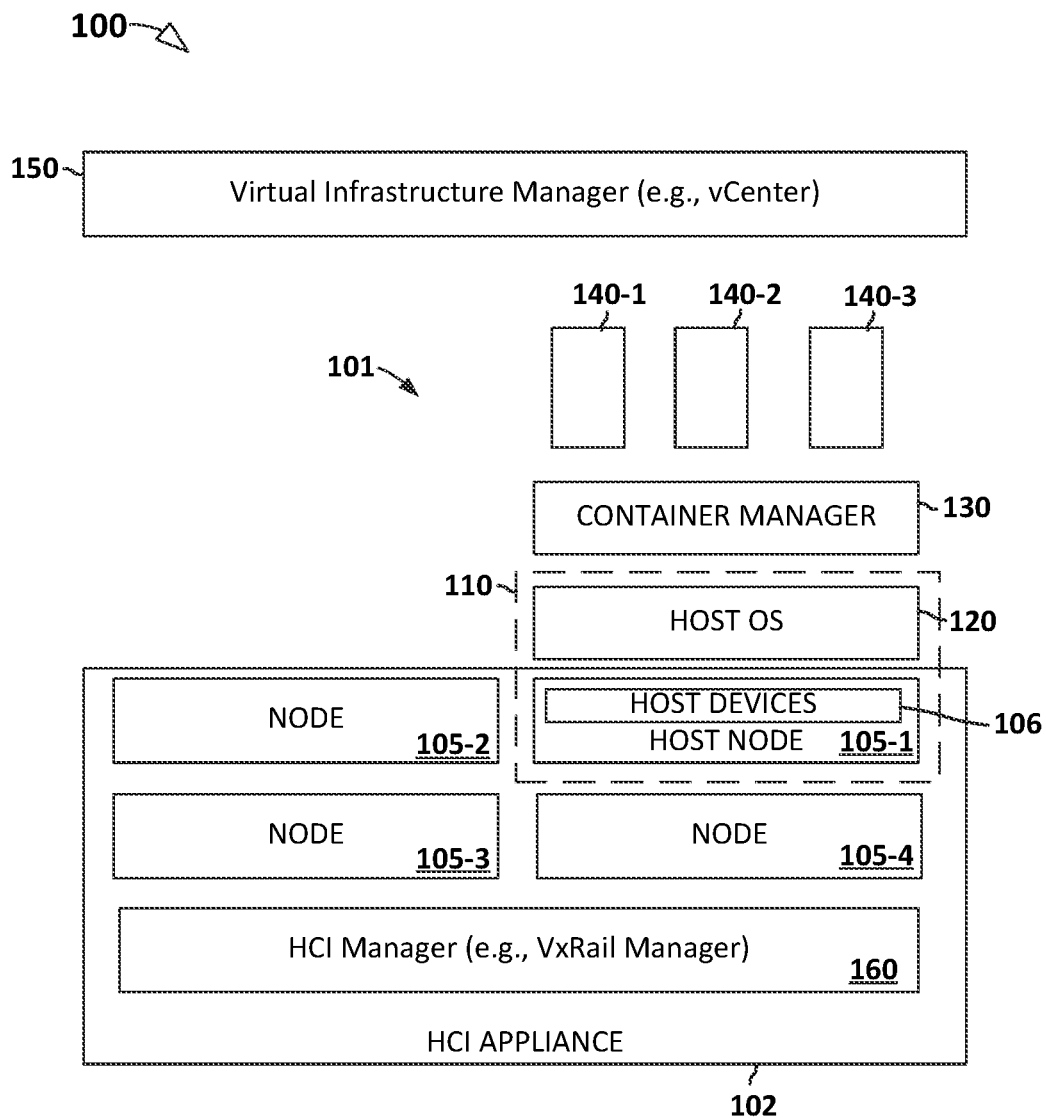
FIG. 1 illustrates a container platform for deploying containerized services.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system 100 configured to create and support a containerized environment referred to herein as container platform 101. The illustrated information handling system 100 implements container platform 101 within a hyper-converged infrastructure (HCI) appliance 102 featuring four nodes 105 housed in a common chassis and including a host node 105-1 that supports the illustrated container platform 101. HCI appliance 102, as suggested by its name, incorporates an HCI architecture including virtualized and tightly-integrated compute, storage, and network resources. In at least some embodiments, each node 105 of HCI appliance 102 is a distinct physical resource that also incorporates an HCI architecture. Commercially distributed examples of an appliance suitable for use as the HCI appliance 102 of FIG. 1 include any of the G Series models of Dell EMC VxRail appliances from Dell Technologies. Although FIG. 1 illustrates container platform 101 implemented within a multi-node HCI appliance, other embodiments may employ two or more single-node HCI appliances. More generally, container platform 101 may, in other embodiments, be included in any suitable virtual-capable server-class information handling system.

The container platform 101 of FIG. 1 includes a host system or, more simply, a host 110 encompassing physical resources collectively referred to herein as host devices 106 and a host operating system (OS) 120. Host resources 106 may include one or more central processing units (CPUs), memory and storage devices, and networking devices. For the sake of clarity, the individual components comprising host resources 106 have been omitted from FIG. 1. Host OS 120 may be a Linux or Linux derivate OS, a Microsoft Windows family OS, or another suitable general purpose operating system.

A container manager 130 executing within host OS 120 is depicted supporting three containers 140 including first, second, and third containers 140-1, 140-2, and 140-3 respectively. Container manager 130 may be implemented with any of various container orchestration software packages including, without limitation, Docker Swarm, Kubernetes or a suitable alternative. Although FIG. 1 illustrates container manager 130 supporting three containers 140, it will be readily appreciated that container manager 130 may support more or fewer containers.

FIG. 1 further illustrates a virtual infrastructure manager 150 and an HCI manager 160. As suggested by its name, virtual infrastructure manager 150 provides a centralized and extensible platform for managing virtual infrastructure including, but not limited to, the containers 140. In at least some embodiments, virtual infrastructure manager 150 may correspond to vCenter software from Dell Technologies. The illustrated HCI manager 160 provides centralized management services for managing node clusters within the HCI appliance 102. For embodiments that employ a VxRail appliance as HCI appliance 102, HCI management may correspond to VxRail Manager software from Dell Technologies.

Figure 2:
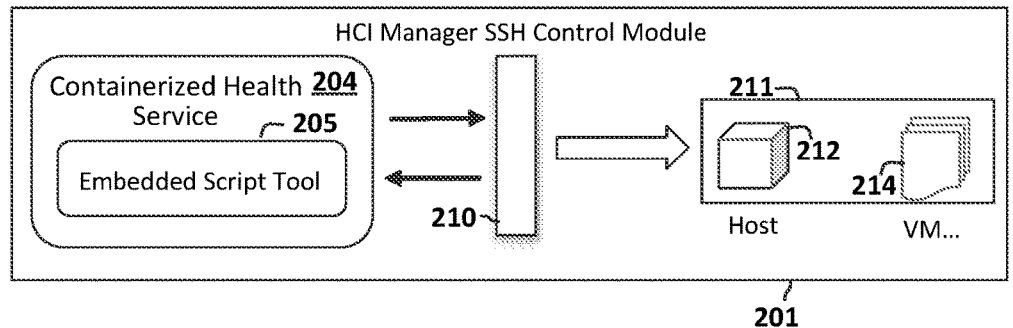
FIG. 2 illustrates a block diagram of a health monitoring service for leveraging a command-line health monitoring script for use within a containerized environment.

FIG. 2 illustrates selected elements of a health monitoring service 201 suitable for leveraging a health monitoring script, such as a command line script, to remotely execute the script on host/VM 211 within a containerized environment. The health monitoring service 201 of FIG. 2 includes a containerized health service 204, an HCI manager SSH control module 210, as well as host/VM 211 including a host device 212 and one or more virtual machines 214 executing therein. The resources and elements illustrated in FIG. 2 may be configured to enable the remote execution of the embedded script 205 on host/VM 211.

Figure 3:
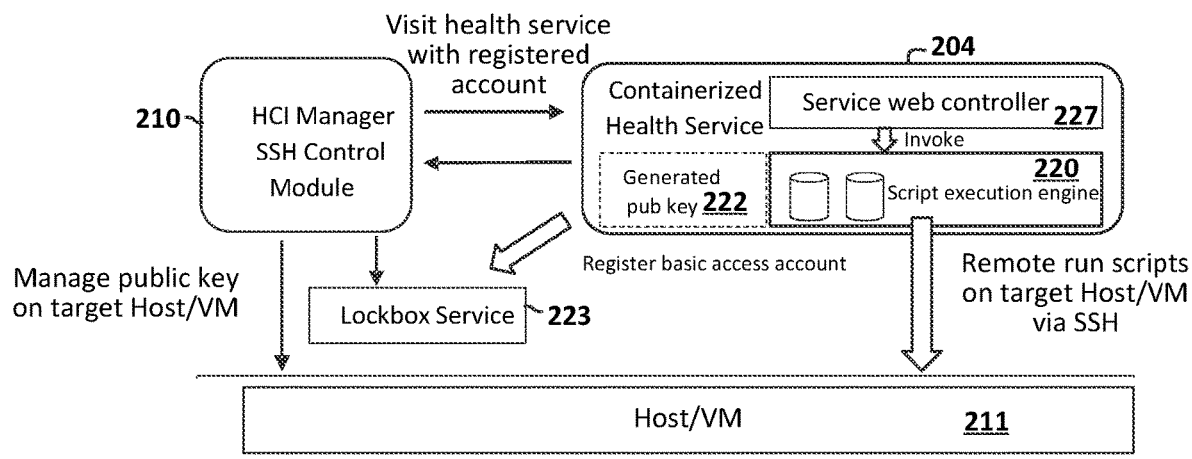
FIG. 3 illustrates a block diagram showing additional details of the health monitoring service of FIG. 2.

Referring now to FIG. 3, additional detail of the health monitoring service 201 depicted in FIG. 2 is illustrated. FIG. 3 illustrates HCI manager SSH control module 210 visiting containerized health service 204 with a registered account. As depicted in FIG. 3, containerized health service 204 includes a service web controller 227 configured to invoke a script execution engine 220 to remotely run scripts on targeted host/VM 211 via SSH. As further depicted in FIG. 3, script execution engine 220 is illustrated generating public key 222, which is provided to HCI manager SSH control module 210 and to a lock box service 223.

Figure 4:
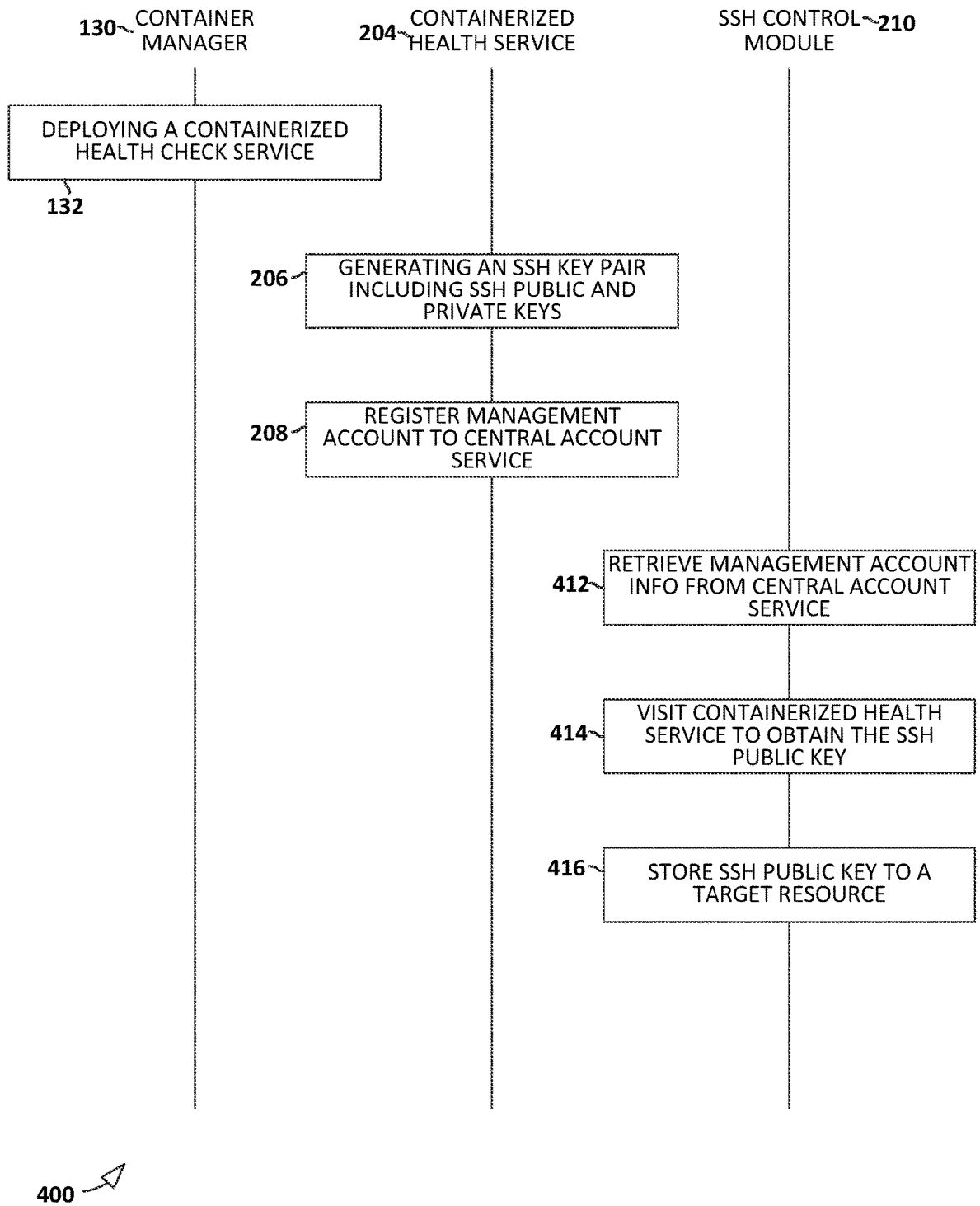
FIG. 4 illustrates a sequence diagram of a disclosed method for leveraging a legacy health monitoring service script within a containerized service.

FIG. 4 illustrates a sequence diagram of a method 400 for leveraging a legacy health monitoring service script within a containerized service. As depicted in FIG. 4, container manager 130 deploys (block 132) a containerized health service 204, which generates (block 206) an SSH key pair, including SSH public and private keys, before registering (block 208) an access account to a central account service. FIG. 4 further illustrates SSH control module 210 retrieving (block 412) access account information from the central account service and visiting (block 414) containerized health service 204 to obtain the SSH public key. SSH control module 210 then stores (block 416) the SSH public key to a target resource.

Figure 5:
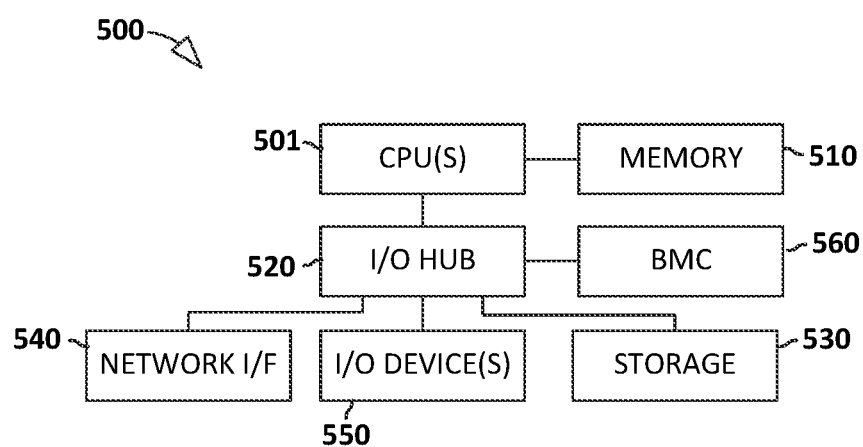
FIG. 5 illustrates an example information handling system suitable for use in conjunction with disclosed health monitoring services.

Referring now to FIG. 5, any one or more of the operations or components illustrated in the preceding figures may implanted as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes a baseboard management controller (BMC) 560 providing, among other features and services, an out-of-band management resource which may be coupled to a management server (not depicted). In at least some embodiments, BMC 560 may manage information handling system 500 even when information handling system 500 is powered off or powered to a standby state. BMC 560 may include a processor, memory, an out-of-band network interface separate from and physically isolated from an in-band network interface of information handling system 500, and/or other embedded information handling resources. In certain embodiments, BMC 560 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing a containerized service, wherein the method comprises:
    retrieving from an access account, registered in a centralized account service of a management resource by a containerized health monitoring service including a legacy health monitoring service script suitable for command line execution, access account information for the containerized health monitoring service;
    accessing, in accordance with the access account information, the containerized health monitoring service to retrieve a secure shell (SSH) public key generated by the containerized health monitoring service;
    storing, by the management resource, the SSH public key to a target resources; and
    enabling an instance of the containerized health monitoring service to remotely execute the legacy health monitoring service script on the target resource with an SSH command.

2. The method of claim 1, wherein the containerized health monitoring service comprises a health monitoring service docker image.

3. The method of claim 1, wherein the management resource comprises a management resource of a hyperconverged infrastructure (HCI) appliance.

4. The method of claim 3, wherein the target resource is selected from: a virtual machine deployed on the HCI appliance and a host within the HCI appliance.

5. An information handling system, comprising:
    a central processing unit (CPU); and
    a memory, accessible to the CPU, including processor-executable instructions that, when executed by the CPU, cause the system to perform health monitoring service management operations, wherein the health monitoring service management operations include:
    retrieving from an access account, registered in a centralized account service of a management resource by a containerized health monitoring service including a legacy health monitoring service script suitable for command line execution, access account information for the containerized health monitoring service;
    accessing, in accordance with the access account information, the containerized health monitoring service to retrieve a secure shell (SSH) public key generated by the containerized health monitoring service;
    storing, by a management service, the SSH public key to a target resource; and enabling an instance of the containerized health monitoring service to remotely execute the legacy health monitoring service script on the target resource with an SSH command.

6. The information handling system of claim 5, wherein the containerized health monitoring service comprises a health monitoring service docker image.

7. The information handling system of claim 5, wherein the management resource comprises a management resource of a hyper-converged infrastructure (HCI) appliance.

8. The information handling system of claim 7, wherein the target resource is selected from: a virtual machine deployed on the HCI appliance and a host within the HCI appliance.

9. A non-transitory computer readable medium including processor-executable instructions that, when executed by a processor of an information handling system, cause the system to perform health monitoring service management operations, wherein the health monitoring service management operations include:

retrieving from an access account, registered in a centralized account service of a management resource by a containerized health monitoring service including a legacy health monitoring service script suitable for command line execution, access account information for the containerized health monitoring service;

accessing, in accordance with the access account information, the containerized health monitoring service to retrieve a secure shell (SSH) public key generated by the containerized health monitoring service;

storing, by the management resource, the SSH public key to a target resources; and enabling an instance of the containerized health monitoring service to remotely execute the legacy health monitoring service script on the target resource with an SSH command.

10. The non-transitory computer readable medium of claim 9, wherein the containerized health monitoring service comprises a health monitoring service docker image.

11. The non-transitory computer readable medium of claim 9, wherein the management resource comprises a management resource of a hyper-converged infrastructure (HCI) appliance.

12. The non-transitory computer readable medium of claim 11, wherein the target resource is selected from: a virtual machine deployed on the HCI appliance and a host within the HCI appliance.

* * * * *